May 29, 1956 N. T. LAVOO 2,748,354

WIDE BAND TELEVISION TUNING CIRCUIT

Filed May 31, 1950

Inventor:
Norman T. Lavoo,
by Paul A. Frank
His Attorney.

United States Patent Office 2,748,354

Patented May 29, 1956

2,748,354

WIDE BAND TELEVISION TUNING CIRCUIT

Norman T. Lavoo, Schenectady, N. Y., assignor to General Electric Company, a corporation of New York Application May 31, 1950, Serial No. 165,163

2 Claims. (Cl. 333—82)

My invention relates to high frequency transmission line tuning apparatus and, more particularly, to a wide band tuning circuit operating at high frequencies.

It is an object of my invention to provide a simple, economical tuning circuit capable of being tuned to any frequency within a wide frequency band.

It is a further object of my invention to provide a new and improved tuning circuit which is capable of being tuned to any frequency within a frequency band from 475 megacycles to 890 megacycles.

In the attainment of the foregoing objects, I provide a novel type of transmission line connected between the control electrode and the anode of an electronic valve. The transmission line comprises a pair of flat metallic plates short-circuited at one end and connected to the anode of an electronic valve. A metallic strip is located between the plates and connected to the control electrode of the valve. Consequently, the anode and control electrode of the electronic valve terminate one end of the line and the other end is short-circuited. The line is tuned to the high frequency end of the tuning range by selecting the amount of the metallic strip which is located between the plates and the position of a short-circuiting bar between the plates and the strip, and the line is tuned to lower frequencies by inserting a dielectric slab of low loss material having a very high dielectric constant between the strip and the plates. This method of tuning through a wide frequency range at a high frequency has the advantage of permitting any desired rate of change of frequency with motion of the dielectric slab by properly shaping the dielectric. The higher the dielectric constant of the two slabs, the greater will be the possible tuning range.

Figure 1:
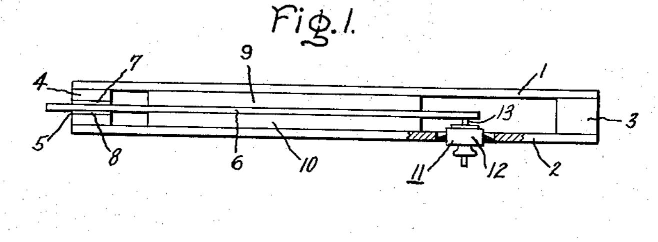
Figure 2:
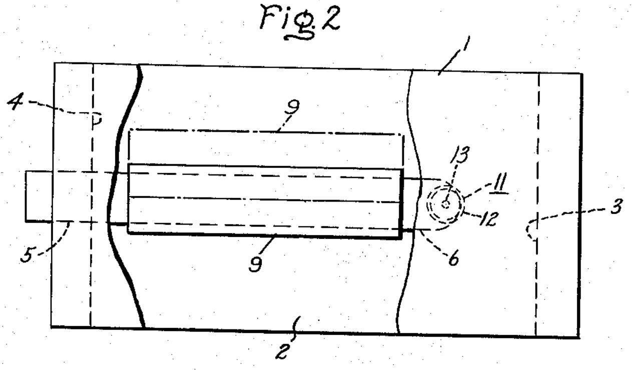

For additional objects and advantages and for a better understanding of my invention, attention is now directed to the following description and accompanying drawing and also to the appended claims in which the features of my invention believed to be novel are particularly pointed out in which Fig. 1 is a schematic diagram of a high frequency tuner; and Fig. 2 is another view of this tuner.

Referring to Figs. 1 and 2, a pair of ground plates 1 and 2 are mounted in parallel planes and separated by a short-circuiting bar 3 at one end and by another short-circuiting bar 4 at the opposite end. Short circuiting bar 4 is provided with a rectangularly shaped slot 5 through its center. A metallic strip 6 located between ground plates 1 and 2 extends through slot 5 and a pair of insulator sheets 7 and 8 constructed, for example, of a material such as mica, insulate strip 6 from short-circuiting bar 4 for direct currents and provide a short circuit between strip 6 and bar 4 for high frequency currents. A pair of dielectric low loss slabs 9 and 10, which are slidable along an axis transverse to the length of strip 6 and within plates 1 and 2 and which may be of any convenient shape, separate strip 6 from plates 1 and 2. Electronic tube 11 has its control electrode 12 connected to ground plate 2 and its anode 13 connected to strip 6. Metallic strip 6 is also slidable within plates 1 and 2. To prevent radiation, ground plates 1 and 2 are made much wider than the spacing between them. Bar 3 is used primarily as a physical support separating plates 1 and 2, and if it is located at a distance from electron tube 11, which is greater than approximately twice the separation of plates 1 and 2, electric fields at this point are of such low intensity that a metallic short-circuiting bar may be employed without effecting the tuning of the line.

The amount of strip 6 located between short-circuiting bar 4 and device 11, and the amount of dielectric material 9 and 10 appearing between strip 6 and plates 1 and 2 determine the electrical length of transmission line between the anode and control electrode of device 11. Hence, any of these parameters may be used to tune the tube to any frequency desired within, of course, a practical range. Insulators 7 and 8 acts as short circuits for high frequency currents and, therefore, together with bar 4 serve as a bypass for the high frequency currents between plates 1 and 2 and strip 6 while preventing the anode voltage of the device 11 from appearing at the control electrode. As slabs 9 and 10 are withdrawn from between strip 6 and plates 1 and 2, the electrical length of transmission line between the anode and control electrode of device 11 is shortened, and, consequently, the resonant frequency of the line is increased. As is known in the art, if the length of plates 1 and 2 between the anode of device 11 and bar 4 is a quarter wave length at the operating frequency, this device will be characterized by sharper tuning and by a higher resonant frequency impedance than if some other length of line is used. Because there is a capacitance within the tube appearing between the anode and control electrode, it should be understood that the physical length of the transmission line between the tube and the short circuit is not exactly one quarter wave length of the operating wave length but must be less than this length such that the inductive reactance of the line balances out or neutralizes the interelectrode capacitance of device 11.

This device has the advantage of simple and economical construction, frequency control throughout a wide frequency band, and application within the frequency band which is presently allocated to televison.

While this invention has been described by a particular embodiment thereof, it will be understood that those skilled in the art may make many changes and modifications without departing from my invention. Therefore, by the appended claims, I intend to cover any such modifications as fall within the true spirit and scope of my invention.

What I claim as new and desire to secure by Letters Patent of the United States is:

1. A high frequency tuning circuit tunable over a frequency range comprising a pair of flat metallic plates located in parallel planes and short-circuited at one end, a flat metallic strip located in a third plane, said third plane being parallel to said pair of parallel planes and being located therebetween, means opposite said one end forming a high frequency short circuit and a direct current insulator between said strip and plates for mounting said strip in said third plane, said circuit being resonated at the high frequency end of the tuning range by the position of said mounting means, a pair of dielectric slabs located between said strip and said plates, the amount of said slabs located between said strip and said plates being adjustable to tune said circuit.

2. A high frequency tuning circuit comprising first and second flat, rectangularly-shaped, metallic plates, said plates being located in parallel planes, first and second metallic short-circuiting bars mounted in parallel relationship, said plates being separated by said bars and being electrically connected at opposite ends by said bars, said first bar being provided therethrough with a rectangular slot the major axis of which is parallel to the longitudinal axis of said bar and which is parallel to the planes of said plates, a flat metallic strip located halfway between said plates and extending through and being insulated from the slot in said first bar, a first and a second dielectric slab, said first slab being positioned between said strip and said first plate, said second slab being positioned between said strip and said second plate, and an electronic valve provided with an anode and a control electrode coupled respectively to said strip and to said first plate, whereby the amount of said slabs between said plates determines the resonant frequency of said device.

References Cited in the file of this patent

UNITED STATES PATENTS

| | | |
|---|---|---|
| 1,745,949 | Newell | Feb. 4, 1930 |
| 2,297,516 | Walter | Sept. 29, 1942 |
| 2,404,261 | Whinnery | July 16, 1946 |
| 2,436,427 | Ginzton | Feb. 24, 1948 |
| 2,462,866 | Hotine | Mar. 1, 1949 |
| 2,561,417 | Ryan | July 24, 1951 |
| 2,562,921 | Kandoian | Aug. 7, 1951 |

OTHER REFERENCES

Terman: Radio Engineering, published by McGraw-Hill Book Co., 1947, pp. 434–435 relied on. (Copy in Patent Office Library.)